US008842015B2

(12) United States Patent
Scott

(10) Patent No.: US 8,842,015 B2
(45) Date of Patent: Sep. 23, 2014

(54) SYSTEM FOR PREVENTING FRIENDLY FIRE ACCIDENTS

(75) Inventor: Michael Scott, Wellington (NZ)

(73) Assignee: Safety Lab Holdings Limited, Wellington (NZ)

( * ) Notice: Subject to any disclaimer, the term of this patent is extended or adjusted under 35 U.S.C. 154(b) by 151 days.

(21) Appl. No.: 13/548,285

(22) Filed: Jul. 13, 2012

(65) Prior Publication Data

US 2013/0015977 A1    Jan. 17, 2013

(30) Foreign Application Priority Data

Jul. 13, 2011    (NZ) .......................................... 594034

(51) Int. Cl.
| | |
|---|---|
| *G08B 17/12* | (2006.01) |
| *G01S 17/74* | (2006.01) |
| *F41A 33/02* | (2006.01) |
| *G01S 13/78* | (2006.01) |
| *F41G 3/26* | (2006.01) |

(52) U.S. Cl.
CPC ............... *G01S 17/74* (2013.01); *F41G 3/2661* (2013.01); *F41A 33/02* (2013.01); *G01S 13/78* (2013.01)
USPC ........................................... 340/600; 434/11

(58) Field of Classification Search
CPC ....... G01S 17/74; G01S 17/026; F41A 33/00; F41A 33/02; F41G 3/2661; F41G 3/265
USPC ........... 340/600, 505; 342/53, 54, 90, 91, 94; 356/4.01; 398/137, 169, 170; 434/11, 434/19, 21, 22
See application file for complete search history.

(56) References Cited

U.S. PATENT DOCUMENTS

| | | | | |
|---|---|---|---|---|
| 3,891,966 | A * | 6/1975 | Sztankay | 340/903 |
| 6,174,169 | B1 * | 1/2001 | Gerber | 434/11 |
| 6,439,892 | B1 * | 8/2002 | Gerber | 434/11 |
| 6,603,134 | B1 | 8/2003 | Wild et al. | |
| 7,282,695 | B2 | 10/2007 | Weber et al. | |
| 7,308,207 | B2 | 12/2007 | Chen | |
| 7,720,388 | B2 * | 5/2010 | Varshneya et al. | 398/137 |
| 7,831,150 | B2 * | 11/2010 | Roes et al. | 398/170 |
| 8,279,414 | B2 | 10/2012 | Eklund et al. | |
| 8,474,172 | B2 * | 7/2013 | Ivtsenkov et al. | 340/505 |
| 2004/0183712 | A1 * | 9/2004 | Levitan et al. | 342/22 |
| 2007/0205890 | A1 | 9/2007 | Brown | |
| 2011/0063102 | A1 | 3/2011 | Ivtsenkov et al. | |
| 2012/0003612 | A1 * | 1/2012 | Gerber et al. | 434/11 |
| 2013/0050010 | A1 * | 2/2013 | Nordlander | 342/45 |

* cited by examiner

*Primary Examiner* — John A Tweel, Jr.
(74) *Attorney, Agent, or Firm* — Merek, Blackmon & Voorhees, LLC

(57) ABSTRACT

In a preferred embodiment, the present invention relates to a hand-held or "gun/firearm mounted" electromagnetic transceiver acting as a pulsed RADAR (i.e., "Radio Detection and Ranging") or LIDAR (i.e., "Light Detection and Ranging") device that can detect the presence of one or many passive retro-reflectors attached to or worn by people or objects that are close or distant in a preferred angle of detection. In a preferred embodiment this device could be mounted on a gun and would alert the user if a retro-reflector is detected in the direction of fire. Additional sensors can be used to change the effective field of detection, to save energy or to provide multiple parallel sensors for these and other reasons.

20 Claims, 4 Drawing Sheets

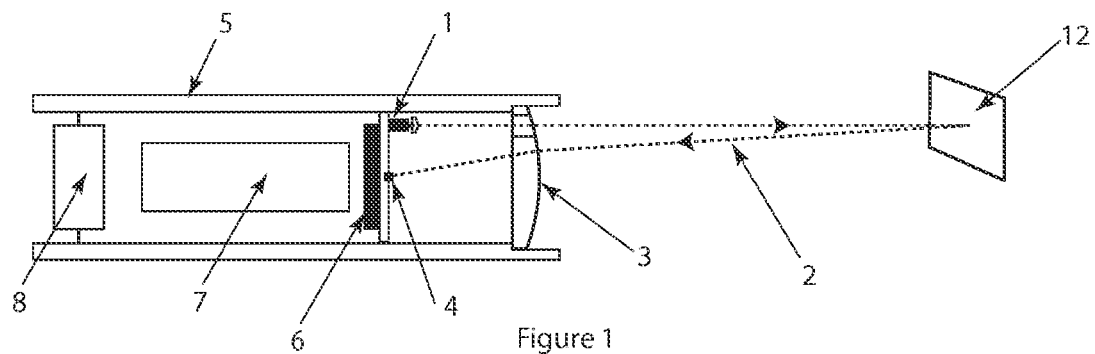
Figure 1
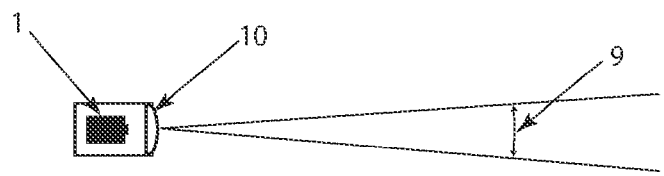
Figure 2
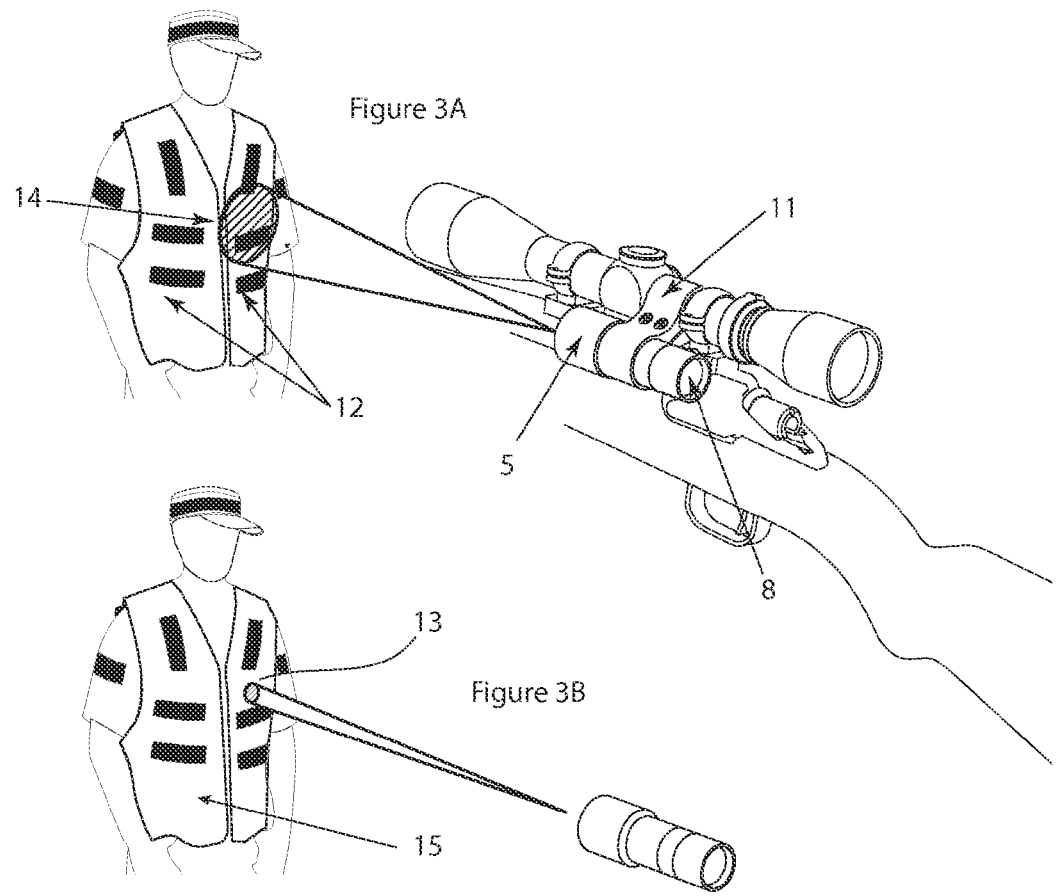
Figure 3A
Figure 3B

SYSTEM FOR PREVENTING FRIENDLY FIRE ACCIDENTS

BACKGROUND OF THE INVENTION

1. Field of the Invention

The present application relates to a system and method for preventing friendly fire accidents.

2. Description of the Prior Art

The present invention relates to a hand-held electromagnetic transceiver acting as a pulsed RADAR (Radio Detection and Ranging) and/or LIDAR (Light Detection and Ranging) device that can detect the presence of one or many objects via passive retro-reflectors that are close or distant in a preferred angle of detection and to ignore any retro-reflector not within that preferred angle of detection.

More particularly, the present invention relates to a system and device to prevent inadvertent targeting and to avoid shooting accidents.

BACKGROUND

Examples of target location and direction-finding devices and systems are known in the art, including identification of 'friend or foe' (IFF), systems sensitive to movement, proximity sensing, radio location and RADAR/LIDAR, particularly those using radio frequency and infrared light or a combination of both.

Much of the prior art describes IFF systems for use in combat or military exercise. Such systems are relatively complex. Other systems designed for sport and hunting are unresolved or impractical.

None of these however offer a simple and practical system, suitable for a variety of situations: for example, a system comprising passive retro-reflectors in preference to prior art encoded transmission signals, matched ID codes or powered transponders and transmitters that are paired.

Examples of such prior art systems are U.S. Pat. No. 4,763, 361 'System and device for recognition or IFF use' and US patent 2011063102 'Interrogator-transponder RF system for prevention of hunting accidents'.

Unlike these types of systems, the present invention does not rely on a powered transponder or transmitter, or for any transmitter to be uniquely paired to a remote particular transceiver or receiver by means of an identification code or similar.

It is an advantage of the present invention that it can detect the presence of several passive retro-reflectors located at any range within the predetermined direction.

It is a further advantage that the present invention does not rely on movement or agitation; for example, the present invention does not rely on being swept back and forth in order to determine peak signal strength, does not require rotation about a vertical axis, nor does it rely on signal modulation from the target to aid detection.

A significant amount of the prior art describes systems used to facilitate the location or presence of people and property for various purposes, including preventing friendly fire accidents. Many of these systems require the use of a transmitter or transponder to facilitate location. For example: US patent 2011063102 Interrogator-transponder RF system for prevention of hunting accidents; WO2010006484 Direction finding antenna systems and methods of use thereof; U.S. Pat. No. 5,771,002 Tracking system using radio frequency signals; U.S. Pat. No. 5,307,053 Device and method for alerting hunters; U.S. Pat. No. 5,183,951 Weaponry signal apparatus; US patent 2007241913 Hunter proximity detection system; US patent 2011068980 Direction finding method and device; US patent 2010309058 System and methods for direction finding using a handheld device; EP 2278351 Assisted direction finding apparatus; and FR2790547 Hunting accidents firearm activation prevention system having all direction fixed frequency transmitter and firearm attached directional receiver transmitter frequency tuned/activating inhibition mechanism.

For use in a hunting or tactical situation, the prior art has many limitations:

a person seeking to be detectable must carry or wear a battery powered transmitter or transponder, thus when the batteries fail, so does their detectability light and high frequency radio waves will not travel through the human body so multiple transmitters or transponders must be attached to the body to provide 360 degree coverage the systems using radio frequency at low enough frequency to pass through the user's body are non-directional and are based on proximity sensing, which might yield false positive results from targets not in the direction of interest;

it is unclear how interference from one's own radio transmitter or that of a proximal companion can be avoided without the reliance on paired IDs, the use of which would greatly reduce system practicality.

Some of the IFF systems found in the prior art use the properties of retro-reflection to facilitate detection but rely on relatively complex methods of encryption or signal modulation to ensure the response comes from a friend not a foe. Examples of such IFF systems are: U.S. Pat. No. 4,361,911 Laser retroreflector system for identification of friend or foe; U.S. Pat. No. 4,763,361 System and device for recognition or IFF use; U.S. Pat. No. 7,308,207 Method for identifying an interrogated object using a dynamic optical tag; U.S. Pat. No. 5,459,470 Beam steered laser IFF system; U.S. Pat. No. 4,763,361 System and device for recognition or IFF use; US patent 2009/0146793 System and method for monitoring objects, people, animals or place; U.S. Pat. No. 5,375,008 Systems for distinguishing between friendly ground targets and those of a foe; U.S. Pat. No. 5,355,241 Identification friend or foe discriminator; U.S. Pat. No. 5,422,645 Delayed laser retroreflector pulse technique and system; WO2009131481 Device for preventing ally soldiers to be damaged on a battlefield; WO2008109978 Cost-effective friend-or-foe (IFF) battlefield infrared alarm and identification system; U.S. Pat. No. 7,649,617 Retro detector system.

A drawback to these retro-reflector systems is that they rely on the target to send back a modified signal that in some way assists the receiver in distinguishing a target reflection from a reflection coming from a non-target source such as from the surrounding environment. This requirement adds complication and cost and often requires the target to be powered.

SUMMARY OF THE INVENTION

The present invention relates to a hand-held electromagnetic transceiver acting as a pulsed RADAR (Radio Detection and Ranging) or LIDAR (Light Detection and Ranging) device that can detect the presence of one or many objects via passive retro-reflectors that are close or distant in a preferred angle of detection and to ignore any retro-reflector not within that preferred angle of detection.

It is an object of the present invention to avoid complexity. Unlike some RADAR/LIDAR devices that seek to measure speed and/or direction of travel, or to distinguish friend from foe, the present invention is primarily concerned with the detection of any suitable retro-reflector in a relatively narrow field of view. In a preferred embodiment the present invention provides means to warn a hunter, law enforcement officer or shooter if their firearm is pointed in an unsafe direction, for example towards a person or object that has been mistaken for a legitimate target. The invention could be mounted on a gun and would alert the user if a retro-reflector is detected in the direction of fire by means of a visual, audible or vibration alert or a combination of such alerts.

In a further embodiment the system comprises a LIDAR and retro-reflector whereby the LIDAR is configured to transmit an infrared laser beam in a determined direction and to detect the reflected signal from any suitable retro-reflector. If the laser strikes a suitable retro-reflector, the intensity of the reflection returned to the transceiver enables detection.

Additionally, in a preferred embodiment the type of retro-reflective material would comprise either wide-angle exposed retro-reflective lenses such as 3M SCOTCHLITE™ or micro-prismatic retro-reflectors such as those made by Reflexite Corporation. Patches or strips of this retro-reflective material can be applied to the clothing and equipment of those seeking to be detectable.

Additionally this retroreflective material could be coated with an infrared transparent substance so it remains reflective to infrared light but is relatively dull and non-reflective to visible light. This will aid covertness in situations where a degree of stealth is desired.

In a further embodiment the system comprises a RADAR and retro-reflector. The radar is configured to transmit a narrow beam of radio frequency in the direction of interest and to detect the reflected signal from a compatible retro-reflector. The retro-reflector increases the radar cross section (RCS) of the target sufficiently to enable detection. In a preferred embodiment the retro-reflector would be a passive Van-Atta type retro-reflector. In another embodiment the retro-reflector could be a semi-passive Van-Atta type retro-reflector transponder that can modulate the reflected return signal in some way to facilitate detection above background clutter. In another embodiment, radar-reflective fabric could be used to increase RCS. A metallic corner-cube retro-reflector could also be used in situations where physical size is less important.

Additionally, the preferred embodiment incorporates a method for overcoming false-positive results that can occur when unwanted side-lobe radiation from the radar is reflected from proximal retro-reflectors not in the preferred direction of interest.

The present invention can discriminate between non-target reflections from the surrounding environment and retro-reflections from the target by comparing the intensity of those reflections against a preset intensity threshold limit that decreases approximately exponentially over time. This threshold limit represents the maximum intensity that could result from any naturally occurring source of a reflected signal. As a reflected signal returns to the transceiver, the intensity of that signal is compared against the pre-defined threshold limit by a microprocessor or comparator circuit in the transceiver. If the signal strength exceeds the preset threshold limit at any time, the signal is likely to have come from a target retro-reflector.

The transceivers in the above embodiments are optimally of a size suitable to be mounted on a handheld firearm. The retro-reflectors described in the above embodiments are optimally of a size suitable for attachment to a person's clothing and equipment.

Further features that may be included in one or more embodiment may include:

A. an indication of the distance to the target;
B. one or more additional sensors that can detect the wavelength of light corresponding to the high-visibility orange garments worn by hunters;
C. an optical system as described herein using an LED instead of or in addition to a laser;
D. an adjustable beam-width;
E. variable power or threshold settings;
F. alternated high power, low power pulses to avoid saturation from environmental reflections at close range;
G. an array of emitters or sensors to provide a wide-angle field of detection;
H. means by which the system described herein can communicate with a compatible aiming sight so that a visual alert contained within that aiming sight can warn the shooter of danger. In one embodiment this alert might consist of an illuminated warning icon inside a compatible optical sight that is wirelessly activated by the transceiver device upon detection; or
I. means by which a visual alert can be mounted separately from the transceiver device such that this alert is more inline with the shooter's line of sight while aiming. For example on a shotgun, the main body of the device could be mounted under the barrel, but could be connected either with or without wires to a separate visual alert means mounted inline with the shooter's field of view while aiming along the barrel.

BRIEF DESCRIPTION OF THE DRAWINGS

FIG. 1 is a diagrammatic view of the invention according to at least one embodiment showing a LIDAR embodiment and a retro-reflective target.

FIG. 2 is a diagrammatic view of a LIDAR embodiment of the invention shown in FIG. 1, showing its focusing lens and beam divergence.

FIG. 3A shows an environmental view of a wide field embodiment of the invention attached to a firearm that is pointed at a target with strips of retro-reflective material attached to an item of clothing.

FIG. 3B shows an environmental view of a target for a narrow field embodiment of the preferred embodiment of the invention attached to a firearm.

ITEMIZED LISTING OF THE MAIN COMPONENTS OF THE SYSTEM

Figure 4:
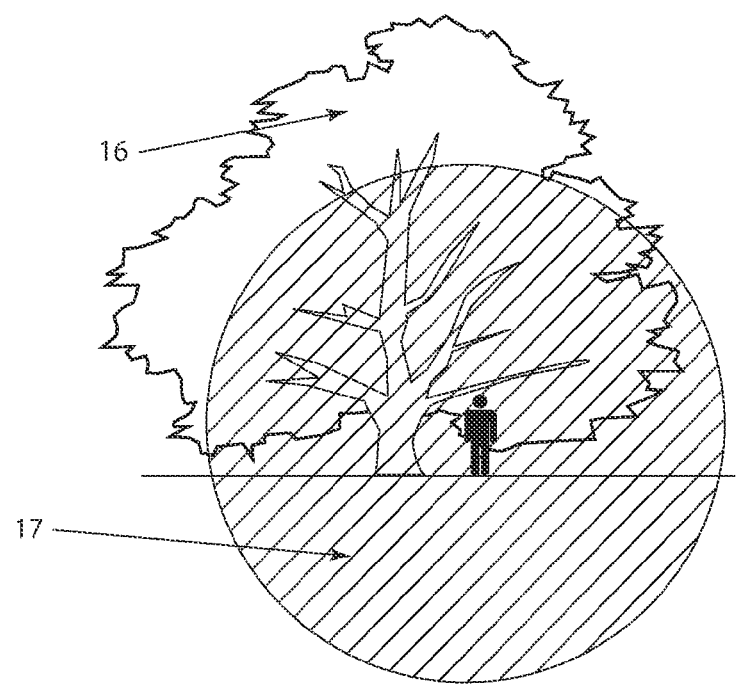
FIG. 4 is a diagrammatic view of the invention showing potential background clutter that rapidly increases with distance as the laser of the LIDAR embodiment diverges.

1. Laser diode
2. Retro-reflected signal
3. Collection lens

4. Photo-detector
5. Cylindrical LIDAR housing
6. Microprocessor and/or comparator circuit.
7. Battery
8. Means of alert
9. Laser beam divergence angle
10. Lens to shape and diverge laser beam
11. Mounting bracket
12. Retro-reflective material
13. A small area of illumination resulting from a relatively non-divergent laser source
14. Area of illumination incident on target retro-reflectors
15. Item of clothing with attached retro-reflectors
16. A source of environmental reflections (clutter)
17. An illustration of how increased beam divergence and/or distance to the target can result in a rapid increase in clutter
18. The preset intensity vs. time threshold limit
19. A spike in signal intensity coming from a retro-reflected signal
20. A spike in signal intensity coming from an environmental reflection
21. Cylindrical RADAR housing
22. Direction of interest
23. Beam-width
24. Primary antenna
25. Secondary antenna
26. Micro-processor or comparator circuit
27. Battery
28. Alert means
29. Main lobe showing strong gain in direction of interest
30. Opposite lobe
31. Side lobes
32. Retro-reflector in direction of interest
33. Retro-reflector of user
34. Retro-reflector of proximal companion
35. Gain plot from secondary antenna.

DETAILED DESCRIPTION OF THE INVENTION

In a preferred embodiment, the present invention relates to system for warning a hunter, shooter or law enforcement officer that their firearm is pointed in an unsafe direction, for example towards a person or object that has been mistaken for a legitimate target.

Much of the prior art in this field describes IFF (Identify Friend or Foe) systems for military use that are relatively complex, or systems for hunters that are unresolved or not practical for a hunting situation. An advantage of the present invention is its simple and practical means for use in a variety of situations. To further reduce complexity, cost, and power requirements, the system makes use of passive retro-reflectors to facilitate the detection of any compatible unintended target without the requirement for encoded transmission signals, matched ID codes or powered transponders and transmitters that are common to the prior art.

In a preferred embodiment, the present invention relates to a hand-held or "gun/firearm mounted" electromagnetic transceiver acting as a pulsed RADAR (Radio Detection and Ranging) or LIDAR (Light Detection and Ranging) device that can detect the presence of one or many passive retro-reflectors attached to or worn by people or objects that are close or distant in a preferred angle of detection. Unlike some RADAR/LIDAR devices that seek to measure speed and/or direction or to distinguish friend from foe, the present invention seeks to avoid complexity and is primarily concerned with the detection of any suitable retro-reflector in a relatively narrow field of view, either stationary or moving. In a preferred embodiment this device could be mounted on a gun (or other weapon or projectile device such as crossbows, compound bows, paint guns, etc.) and would alert the user if a retro-reflector is detected in the direction of fire. Retro-reflective material can be applied cheaply and easily to facilitate detectability and requires no battery power. An example of such a material is 3M SCOTCHLITE™.

Embodiments of the present invention include:

A. A system comprising LIDAR and retro-reflector operating as separate devices. The LIDAR is configured to transmit an infrared laser beam in the preferred direction of interest and to detect the reflected signal from any suitable retro-reflector. If the laser strikes a suitable retro-reflector, the intensity of the reflected signal can enable detection. In a preferred embodiment the type of retro-reflective material used would be similar to that commonly found in safety vests designed to facilitate visibility at night and would be incorporated into the clothing and equipment of those seeking to be detectable. Examples of such materials are 3M SCOTCHLITE™ and the micro-prismatic retro-reflectors manufactured by Reflexite Corporation. In a preferred embodiment this retroreflective material would incorporate a visibly-opaque, infrared-transparent (VOIT) coating so that it remains reflective to infrared light but is relatively dull and non-reflective to visible light. This will aid covertness in situations where a degree of stealth is desired, but is not required for the present invention to operate. Other wavelengths could also be used outside of visible and infrared wavelengths as necessary to maintain for example covertness of the operators.

B. A system comprising RADAR and retro-reflector operating as separate devices. The radar is configured to transmit a beam of radio frequency in the direction of interest and to detect the reflected signal from a compatible retro-reflector. The retro-reflector increases the radar cross section (RCS) of the target sufficiently to enable detection above background clutter. In a preferred embodiment the retro-reflector would be a passive Van-Atta type retro-reflector. In another embodiment the retro-reflector could be a semi-passive Van-Atta type retro-reflector transponder that can modulate the reflected signal to facilitate detection above background clutter or for the purposes of codification. In another embodiment, radar-reflective fabric could be used to increase RCS. A metallic corner-cube retro-reflector could be used in situations where physical size is less important.

Additionally, the preferred embodiment incorporates a method for overcoming false-positive results that can occur when unwanted side-lobe radiation from the radar transceiver is reflected from proximal retro-reflectors not in the preferred direction.

The present invention can discriminate between non-target reflections from the surrounding environment and retro-reflections from the target by comparing the intensity of those reflections against a preset intensity threshold limit that decreases approximately exponentially over time. (See FIG. 5) This threshold limit represents the maximum intensity that could result from any naturally occurring source of a reflected signal. As a reflected signal returns to the transceiver, the intensity of that signal is measured and compared against the pre-defined threshold limit by a microprocessor or comparator circuit in the transceiver. If the signal strength exceeds the preset threshold limit at any time, the signal is likely to have come from a man-made retro-reflector.

The comparison of the received signal to the threshold signal can be made in a number of different ways. A table can store values for each time/distance measured and provide a threshold value for comparison. If the received signal is above the threshold value, then the alarm is triggered.

In a preferred embodiment, an analog or continuously variable system is used. Since the preset intensity threshold limit decreases approximately exponentially over time (See FIG. 5), a capacitor can be used to approximate this signal deterioration. If a voltage E is applied across a resistor R to a capacitor C, the total charge across the capacitor will increase inversely exponentially over time, that is, the increase in voltage across the capacitor will slow according to the exponential curve. By choosing the proper charging voltage E, resistor R, and capacitor C, the curve can approximate the threshold voltage necessary to trigger the alarm.

Figure 8:
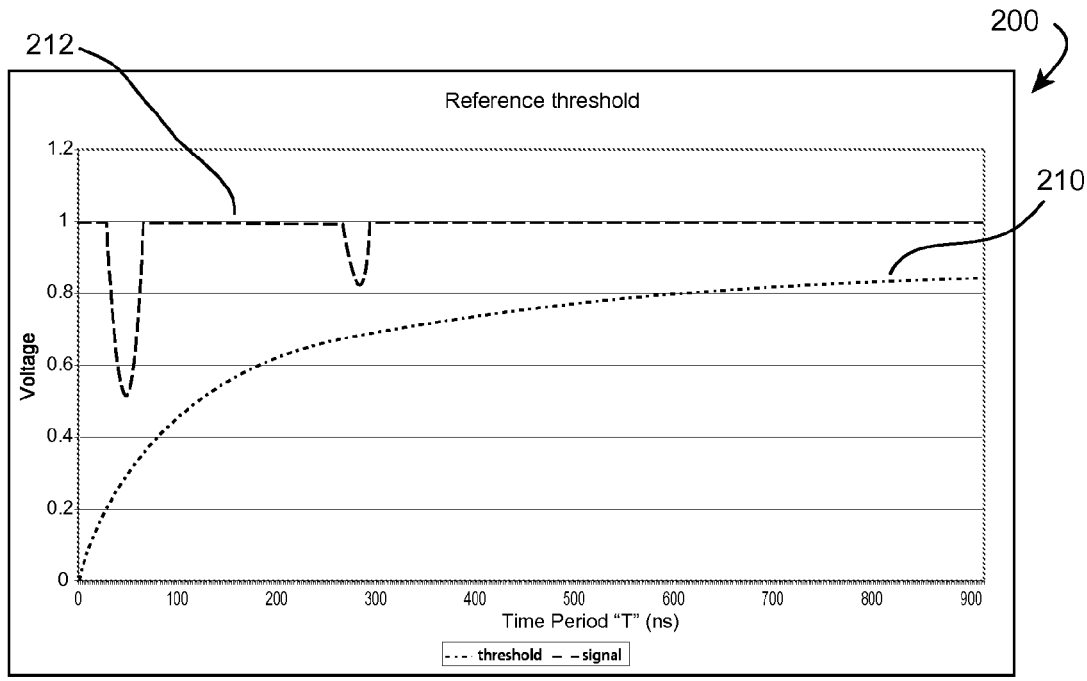
FIG. 8 is a graph of the threshold limit decreasing approximately exponentially over time compared to return signals where no signal triggers an alarm.

FIG. 8 is a graph 200 showing the threshold voltage 210 for triggering the alarm over a time period T since the comparator was reset to analyze a new signal. Plot 212 shows the voltage of returned signals. One skilled in the art would recognize that there should only be one peak for each signal sent out, where the peak occurs when a portion of the signal has been reflected from an object downrange. Other minor peaks could occur, but the graph represents multiple scopings with the main peak from each scoping plotted from the time the comparator resets. Since the signals are sent as light waves and radio waves, the reflections will occur very quickly and the comparator must be reset so that only the reflection from the pulse of interest is being measured.

Figure 9:
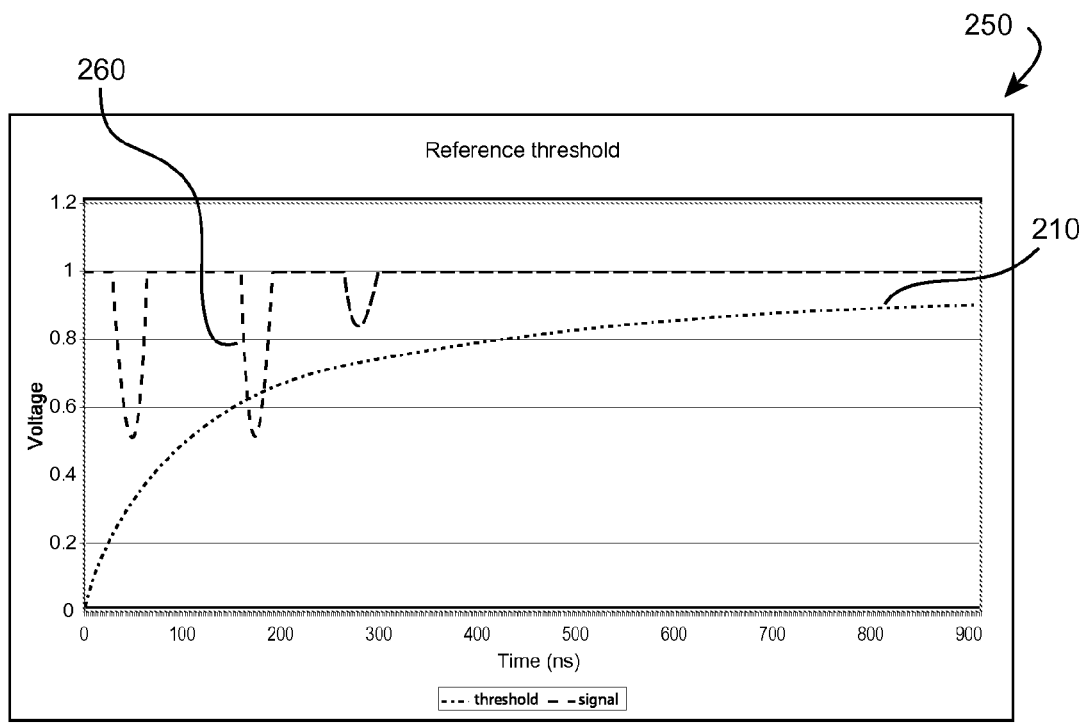
FIG. 9 is a graph of the threshold limit decreasing approximately exponentially over time compared to return signals where at least one signal triggers an alarm.

The comparator then determines from the return signal to determine if the alarm should be triggered. As shown in FIG. 8, each of the return signals is less than the threshold and thus the comparator will determine that an alarm need not be set. However, as shown in FIG. 9, the signal 260 on graph 250 is large enough to indicate that the reflection was caused be something "unnatural" such as a retro-reflector and thus an alarm should be triggered. This calculation could be determined by adding the threshold voltage (or for example, wattage) at the time T to the returned voltage to see if it is above a fixed voltage or by comparing the threshold voltage to the fixed voltage minus the returned voltage, etc.

The threshold voltage can be determined by experimentation and set to a fixed amount or may be made variable to account for different situations (such as snow vs. fall vs. summer). The Example below shows the calculations to determine the amount of voltage caused by a patch of retro-reflective material having a cross-sectional area of 625 cm^2 against a background having a reflectivity coefficient of 0.15

EXAMPLE 1

Received Power Due to Reflection from the Background

Assumptions:

The background is bigger than the beam at any distance, ie all the transmitted power hits the background and atmospheric loss is zero. And reflected power is then output power multiplied by the reflection coefficient. In the worst case the background is very reflective, with a reflection coefficient of 0.8 (eg snow).

Background_Received_Power ($W$)= [($Pi$*Receiver_Aperture_Diameter^2)/4/ (2*$Pi$*Range^2)]*(Power_Landing_on_Target)* Target_Reflectivity     Equation A:

Received Power Due to Reflection from Retroreflective Patch:

Assumptions:

The received power is calculated assuming that no power is reflected from a close by background (this would add signifi-cant power to the returned pulse since most of the transmit power misses the small patch). This would be the case if say a hunter was on a ridge above the shooter; the background would likely be empty sky.

If the patch is larger than the beam (eg at close range) then the effective patch area is taken as the beam area at that range.

The radiometric equivalents of the photometric parameters are used directly, ie we're assuming the retro-reflector material is as effective at near IR as at 555 nm.

Given that 1 candela=1/683 Watts per steradian, coversion of candelas to watts/steradian is as follows:

Retroreflectivity ($W/Sr/Lux/m^2$)=Retroreflectivity ($cd/Lux/m^2$)/683     Equation B:

Luminous Flux Density on the Target is the transmitted power divided by the area of the beam at a given range.

Note that Lux is taken to be equivalent to Watts per square meter.

See equation 2 of the document linked above. Note that the divergence angle has been changed from radians to a full angle in degrees.

Target Luminous Flux Density ($W/m^2$ or $Lux$)=(4× Transmitter_Power)/{$Pi$* [(Full_Divergence_Angle*$Pi$*Range/180)+ Transmitter_Aperture_Diameter]^2}     Equation C:

The area of a patch of retro-reflective material can be calculated by multiplying its length by width for a rectangular patch or as follows for a square patch.

Patch_Area ($m^2$)=Patch_Length^2     Equation D:

The Angular Subtense of the receiver to patch is the angle from the center of the target to the receiver aperture edges. This tells us what proportion of the patches (i.e., a patch of retro-reflective material) reflected power the receiver is seeing. Eg., if we double the receiver aperture diameter, then we would receive 4× the power from the patch, all else being equal.

The equation comes from trig where ArcTan of the receiver radius divided by the distance (range) gives us the associated half angle of the subtense at the receiver. This is then doubled to give us the full angle. The result is then converted to steradians (aka squared radians).

Angular_Subtense_Receiver_to_Patch (steradians)= 2*[ArcTan($Rx$ Diameter/2* Range)]*($Pi$/180)^2     Equation E:

If we multiply the above equations together all the units cancel apart from the Watts unit, i.e., $W/Sr/Lux/m^2 * Lux \times m^2 * Sr$=Wattage     Equation F:

So this gives us our solution:

Received Power Due to Reflection from Retroreflective Patch ($W$)=Retroreflectivity×Target Luminous Flux Density×Patch Area×Angular Subtense $Rx$ to Patch For the following input parameters:

TABLE 1

| Input Parameters: (range is input in the section below) | |
|---|---|
| Patch Retroreflectivity = | 300 cd/lux/m^2 |
| Background Reflectivity Coefficient = | 0.15 |
| Peak Transmitted Power = | 4 W |
| Transmitter Full Divergence Angle = | 1 Degree(s) |
| Patch Length = | 25 cm |
| Reciver Aperture Diameter = | 25 mm |
| Tx Aperture Diameter = | 25 mm |

The following background power (Table 2) and patch powers (Table 3) would result these parameters using the equations above. These together with an approximation of returned noise would give the expected power back at the receiver:

TABLE 2

Calculated Received Power From the Background Versus Range:

| Range (m) | Background Received Power (W) |
|---|---|
| 12.5 | 0.0000003 |
| 25 | 0.000000075 |
| 50 | 1.875E−08 |
| 100 | 4.6875E−09 |
| 200 | 1.17188E−09 |
| 400 | 2.92969E−10 |

TABLE 3

Calculated Receiver Power from the Patch Vs Range:

| Range (m) | RetroReflectivity (W/Sr) | Target Luminous Flux Density (W/m^2 or Lux) | Angular Subtense Rx-Patch (Sr) | Patch Received Power (W) |
|---|---|---|---|---|
| 12.5 | 0.43923865 | 107.0028509 | 3.49066E−05 | 0.000102538 |
| 25 | 0.43923865 | 26.75071272 | 1.74533E−05 | 1.28172E−05 |
| 50 | 0.43923865 | 6.68767818 | 8.72665E−06 | 1.60215E−06 |
| 100 | 0.43923865 | 1.671919545 | 4.36332E−06 | 2.00269E−07 |
| 200 | 0.43923865 | 0.417979886 | 2.18166E−06 | 2.50336E−08 |
| 400 | 0.43923865 | 0.104494972 | 1.09083E−06 | 3.1292E−09 |

Thus with these numbers, one of ordinary skill in the art could determine the hypothetical return to the receiver and use the information to set the threshold for a desired sensitivity, that is so that it will pick up a patch of a given size at a given distance against a particular background ambient reflectivity.

The transceivers in the above embodiments are optimally of a size suitable to be mounted on a handheld firearm. One or more transceivers could be used as needed or for various purposes. The retro-reflectors described in the above embodiments are optimally of a size suitable for attachment to a person's clothing and equipment.

LIDAR EMBODIMENT

In a preferred embodiment of the present invention is a LIDAR transceiver using near-infrared (NIR) light. Preferably, an infrared signal is transmitted in the direction of interest by means of a pulsed laser diode 1 with reflections 2 being collected and focused by an optical lens 3 onto a photo detector 4 such as a PIN diode or an avalanche photo diode. The preferred embodiment uses near-infrared light because it is invisible to humans and animals. Ultraviolet light or other wavelengths could also be suitable but ultraviolet lasers and detectors are significantly more expensive than near infrared ones.

In a preferred embodiment as shown in FIGS. 1 and 2, a cylindrical housing 5 contains a transceiver including an infrared pulsed laser diode 1, an infrared photo sensor 4, a microprocessor or comparator circuit 6, a battery 7 and a means of alert 8. The alert is configured to be automatically activated if a retro-reflector is detected in the transceiver's field of view. The transceiver emits short pulses of laser light in the direction of interest and measures the intensity of the reflected signal. The laser's divergence 9 and shape is modified by means of an optical lens 10. The transceiver housing 5 can be attached to a gun or gun-sight in the direction of fire by means of a mounting bracket 11 (FIG. 3A).

Unlike some IFF systems that are only activated when the user chooses to interrogate the intended target, the present invention is designed to operate continuously once switched on. This benefits the user because they cannot forget to interrogate the target in the excitement of the moment.

Referring to FIGS. 3A & 3B, light emitted by the transceiver must be incident on at least some retro-reflective material 12 to enable detection. FIG. 3 shows a person with patches of retro-reflective material attached to their clothing. Because a non-divergent laser would only illuminate a relatively small area on the target 13 increasing the possibility that the beam will not be incident on some retro-reflective material, or will be blocked by vegetation, the preferred embodiment uses a lens 10 (FIG. 2) to diverge the laser beam.

As distance increases, so does the illuminated area 14, 17. Because many hunting accidents happen at relatively close range 10-50 meters it is important that the beam has sufficient divergence to detect at least some retro-reflective material 12 placed on the target's head or body. The trade-off for increased divergence is that as distance to the target increases, the signal (e.g., reflections from the target) to noise (e.g., reflections from the environment) ratio becomes increasingly small and after a certain distance the target may no longer be detectable. In the preferred embodiment the beam divergence 9 is between 1 and 4 degrees. Separate near and far sensors could be used to provide different diversion patterns over near and far targets, by for example using an LED transceiver for the near range and a LASER transceiver in the far range as described further below.

Figure 5:
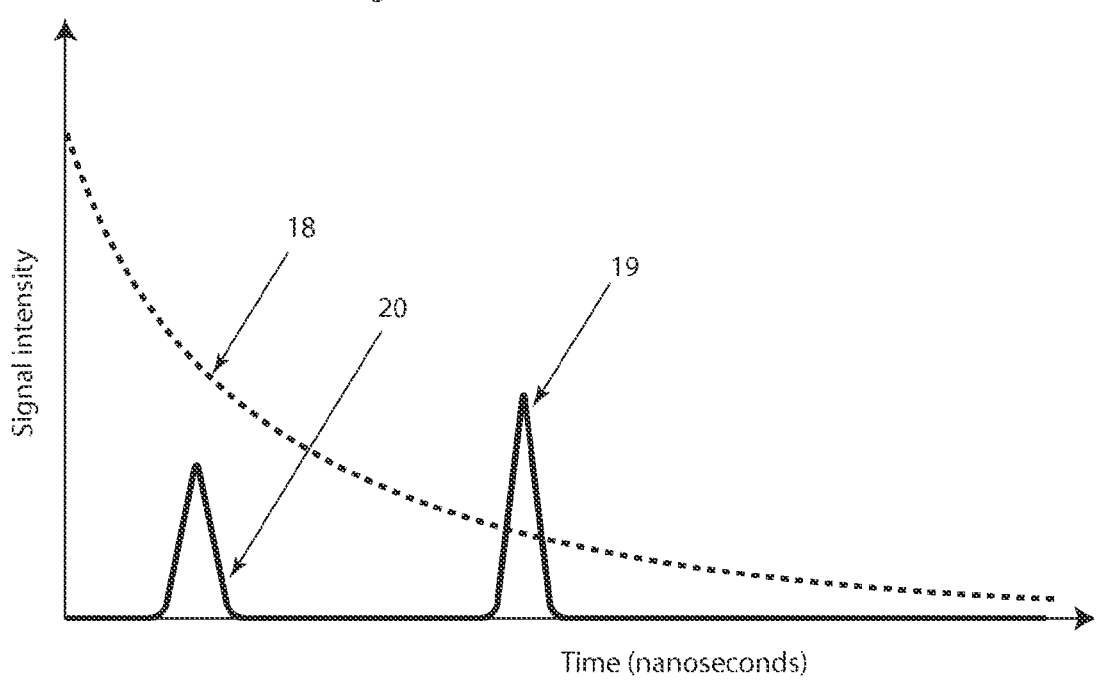
FIG. 5 is a graph showing the preset reference threshold limit and examples of a signal received from a target and non-target reflection.

Referring to FIG. 4, because reflections from a target retro-reflector 12 as seen in FIG. 3 could be of equal magnitude to reflections from background clutter 16, one cannot simply set a threshold of signal strength that if exceeded would indicate a detection. To overcome this problem the present invention compares the intensity of reflected signals against a preset threshold intensity limit that decreases with time 18 (i.e., time for the signal to return to the sensor, an indication of the distance traveled between the sensor and the target) as shown in FIG. 5. Any spike 19 in the signal strength vs. time plot that exceeds this pre-set threshold limit indicates that a retro-reflector has been detected. Reflections from non-target objects such as vegetation at any range 16 will cause peaks in the returning signal 20 but these are unlikely to exceed the threshold limit so will not be detected as an unintended target reflector. In a preferred embodiment, a microprocessor or high-speed comparator circuit compares the intensity of the reflections against the preset intensity/time threshold curve in real-time as the reflected signal returns to the transceiver.

Because the area illuminated by a divergent laser beam increases proportional to the square of the distance to the target, the proportion of signal contributed by a fixed-size retro-reflector will decrease rapidly as distance increases. At a certain distance the retro-reflector will be unable to contribute sufficient intensity for the return signal to exceed the threshold limit. Additionally, and irrespective of the threshold setting, for any given distance to the target, there will be a minimum surface-area of retro-reflective material required to return a strong enough signal to be physically detectable by the transceiver. The transceiver's ability to detect a very small retro-reflector or one at great distance, is limited by the power of the laser, the sensitivity of the photo diode and its amplification circuit, electrical noise, and the size of the receiving optic. For any given transceiver configuration, increasing the area of retro-reflective material visible to the transceiver will significantly increase the maximum detectable range of that target.

Retro-reflections from animal eyes are unlikely to exceed the threshold level because the visible area of reflective material in the back of the eye is comparatively small and limited by pupil size.

Because light waves cannot travel through solid objects, such as the human body, those seeking protection would preferably wear sufficient retro-reflective material to be detectable at any observation angle.

Although the deadly range of a firearm can be several kilometers, most hunting accidents occur at ranges less than 100 meters so the useful operating range of the system for use in a hunting situation can be less than the range of the gun being used, while still effectively eliminating most common accidents.

A preferred embodiment would conform to class-1 laser eye-safety regulations to prevent possible eye injury from the invisible infrared laser. Without that eye-safety limitation, the maximum range of the system could be raised by increasing the power of the laser (and adjusting, for example, the amplitude of the curve of FIG. 5 accordingly). Overall range is governed by a combination of laser power, beam divergence and the size of the retro-reflective target.

In another embodiment, the transceiver could contain a near infrared LED emitter in addition to the NIR laser. To help overcome signal saturation caused by close range environmental reflections, the transceiver would alternate transmissions of laser with transmissions of the LED. Because the signal emitted by the LED is significantly more divergent than the laser, and may be of lower power, it can help avoid saturation while also giving a broader area of illumination at close range. This broad area of illumination would increase the chance of the signal being incident on a retro-reflective patch attached to a person's clothing at close range.

Many commercially available retro-reflective materials will be detectable by the preferred LIDAR embodiment without modification. Examples include wide-angle exposed bead type retroreflectors such as 3M SCOTCHLITE and the micro-prismatic retro-reflectors manufactured by Reflexite Corporation. In a preferred embodiment the retro-reflective material would be optimized to be reflective only to infrared light (or other wavelength of interest) and would be relatively dull and non-reflective in the visible spectrum. This would enable them to be incorporated into camouflage clothing if covertness is required, for example in a hunting situation. Reflexite Corporation manufacture a micro-prismatic retro-reflector optimized for near infrared light that is used as a military marker and is visible to night vision equipment. This infrared retro-reflector appears black and non-reflective in the visible spectrum. Retro-reflective materials could be attached to garments, backpacks and equipment (including hunting equipment such as guns, etc.) by a variety of methods including physical attachment such as sewing or VELCRO, applied as a self-adhesive tape or patch, worn as a removable arm or head band or printed onto fabric that can be made into detectable garments.

RADAR EMBODIMENT

Figure 6:
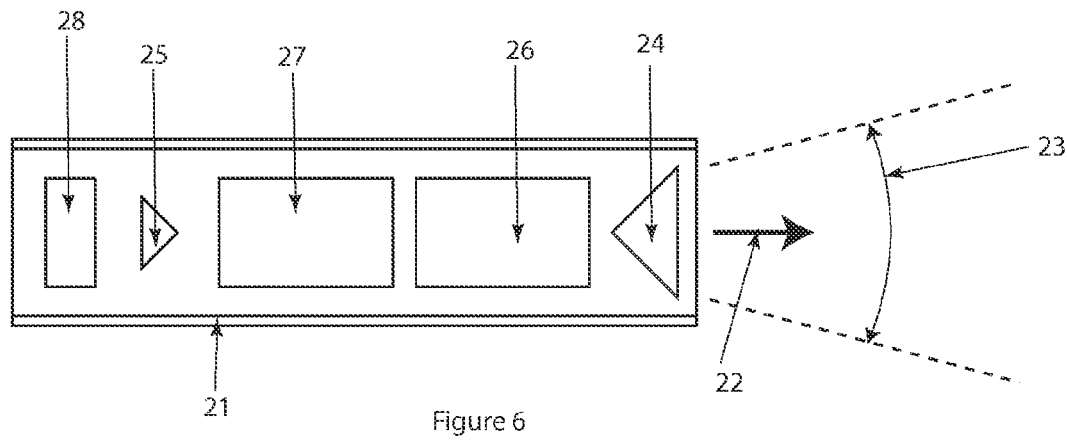
FIG. 6 is a diagrammatic view of an embodiment of the invention utilizing RADAR.

In the preferred embodiment using radio frequency (FIG. 6), a radio transceiver operates preferably in a millimeter band, and more preferably in the unlicensed 60 GHz band. The receiver is housed in a cylindrical enclosure 21. The high frequency of operation allows for a relatively narrow beam-width 23 to be achieved using a small antenna 24 making it suitable for use in a compact handheld device. The beam-width could be fixed or adjustable and could vary between about 5 degrees and 45 degrees or more. Similar to the beam-divergence issues discussed for the LIDAR embodiment, increased beam-width may negatively affect the signal to noise ratio and hence detectable range for a given size of retro-reflective target.

Short pulses of radio frequency are emitted by a directional antenna 24 in the direction of interest 22. This antenna is duplexed so that it can rapidly switch between transmit and receive. Reflections from a passive radio-frequency retro-reflector such as a Van-Atta array, would be detectable based on the same threshold limit curve logic as described previously.

The signal transmitted by the primary antenna 24 would contain a unique random modulation that allows a microprocessor 26 in the transceiver to individually identify and process each of many possible transmissions operating in the system. This unique modulation allows the system to ignore interference from other transceivers that might otherwise inadvertently jam or interfere with the device. In a preferred embodiment this modulation would be pseudo-random.

Figure 7:
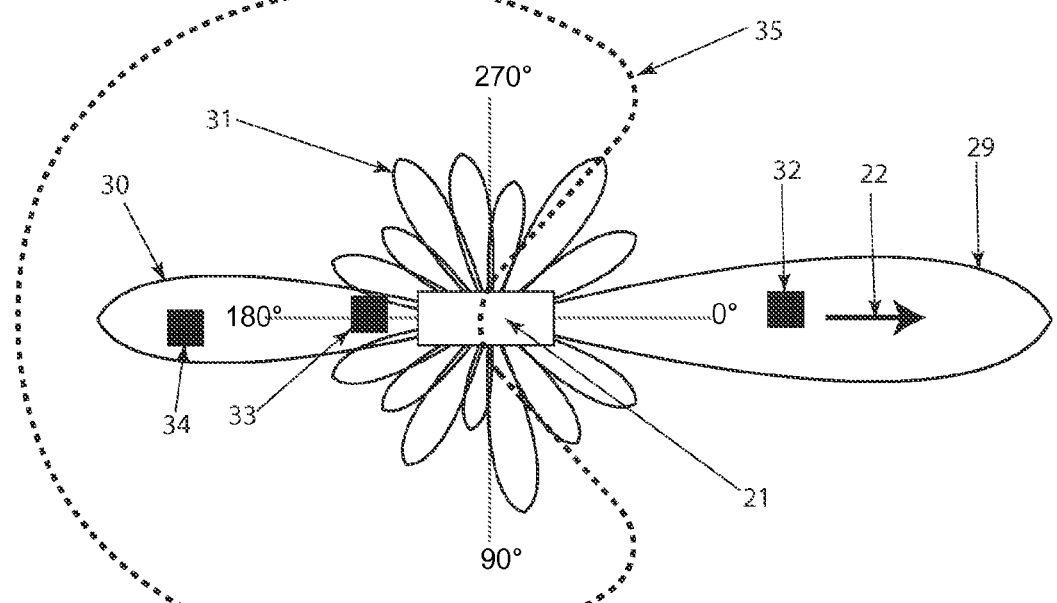
FIG. 7 is a diagrammatic view of the invention showing a typical polar radiation plot for a directional radio antenna illustrating proximal signal interference.

Most directional radio antennas (both receiving and transmitting) show a pattern of 'lobes' or maxima of radiation (FIG. 7). The largest lobe 29 of the primary antenna 24, has high gain in the desired direction of interest 22, and is called the 'main lobe' The other lobes 30, 31 are called 'side-lobes' and represent radiation in unwanted directions. A proximal retro-reflector or transponder falling within those side-lobes 30, 31 could be inadvertently detected resulting in a false-positive result. Excessive signal strength coming from a proximal retro-reflector 34 via a side-lobe may also mask distant weak signals in the direction of interest 22. In the case of a gun-mounted device, side-lobes could be strong enough to detect retro-reflectors worn by the gun's user 33 and a proximal companion 34 resulting in an unwanted detection. The present invention shows how these false-positive results can be avoided by using a secondary antenna 25.

In order to overcome proximal signal interference, the transceiver in the preferred embodiment contains:

A primary antenna 24 that has high gain in the preferred direction of interest 22. The directionality of this antenna results in a preferred angle of reception 23 that may be fixed or variable.

A secondary antenna 25 that is mounted behind the primary antenna and exhibits greater gain 35 than the primary antenna in directions other than the primary direction of interest. The secondary antenna never transmits, it only receives.

In this embodiment, the signal strength from the primary and secondary antennae are compared by the micro-processor 26. If the signal entering the secondary antenna is greater than that entering the primary antenna, it will be ignored (or trigger a different alert) since it must be the result of a side-lobe detection from a proximal retro-reflector not in the preferred direction of interest.

If the received signal matches the pseudo-random modulation of the system, and the signal entering the primary antenna is greater than that entering the secondary antenna, and any signals detected by the primary antenna are greater than the preset threshold limit, then an alert would be triggered.

Radio frequency signals above 10 GHz are unlikely to pass through the human body, so those seeking protection would need to ensure that retro-reflecting devices are suitably positioned to enable detection at all angles, for example one retro-reflector on the front and one on the back of the target.

Features Capable of Use with Both Embodiments

In the preferred embodiments, battery power is conserved by operating the transmit/receive cycle a number of times per second with the period of inactivity being relatively long compared to the period of activity.

In the preferred embodiments the enclosure surrounding the transceiver device 5, 21 (FIGS. 3A & 6) is roughly tubular and not greater than about 30 mm in diameter. It may be attached to a gun or telescopic-sight parallel to the line of fire in such a way that a warning alert 8, 28 can be clearly seen, heard or felt by the shooter. The device may be in place of, in parallel to or in series with the gun scope or sites, for example by mounting to a firearm rail or having a portion interacting with or placed visibly in line with the scope optics such as having a heads up display before or after the scope optics or by plugging into a cooperating scope. The device may interconnect with the firing mechanism to prevent the gun from firing when an unintended target is targeted, that is when a retro-reflector returns a signal from the target area. In another embodiment the device might interact with or be integrated into the body of a gun or optical aiming sight. The preferred form of alert is a visual and may be accompanied by an optional audible alert sound and/or a vibration.

In the preferred embodiments a mounting bracket 11 would be used to attach the transceiver to a telescopic sight or to the barrel of a shotgun in such a position that any visual alerts are clearly visible to the user.

In another embodiment the transceiver might be configured to have a relatively wide field of view for example 45 degrees. This wide field of view could be achieved by increasing the beam-width, or might be achieved using an array of emitter/detector elements assembled in an arc radiating towards the target. A wide field of view will be desirable in some situations for example when a shooter is swinging on game and wants to be warned as early as possible if their guns swings towards a companion, for example in a duck shooting situation using a shotgun. Although the detectable range may be reduced due to the wider field of view, this would not present a major problem on a shotgun because shotguns have a relatively short range compared to a rifle.

In another embodiment of the LIDAR, one or more high intensity NIR LEDs could be substituted for the laser. LEDs have a wider divergence than lasers and are lower cost than lasers potentially making them suitable for short range applications where a wide field-of-view is an advantage.

While the features, components and methods of this invention have been described in terms of preferred embodiments, it will be apparent to those of skill in the art that variations may be applied to the features, components and methods and in the steps or in the sequence of steps of the methods described herein without departing from the concept, spirit and scope of the invention. More specifically, it will be apparent that certain components may be substituted for those described herein while the same or similar results would be achieved. All such similar substitutes and modifications apparent to those skilled in the art are deemed to be within the spirit, scope and concept of the invention.

The term "reflector" as used in this application, unless otherwise specified shall mean "a surface or thing that reflects a high percentage of the light or signal received in the wavelength or range of interest back to the source of the light or signal." For example, glass, mirrors, shiny rocks, purpose-designed reflective clothing and fabrics would be considered reflectors, and grass, leaves, and air would not be considered reflectors even though they may reflect some small amount of light. A normally reflective surface would not be considered "reflective" in the situation if it were angled or oriented such that it did not reflect sufficient light back to the source.

I claim:

1. A method of detecting reflectors within a field of vision, comprising:

providing a sensor body having an electromagnetic transceiver for sending and receiving an electromagnetic signal, said sensor body further having a comparator, a timer and an alarm signal;

said transceiver sending an electromagnetic signal downrange to an area of interest;

said transceiver receiving a reflected signal comprising in part the sent electromagnetic signal;

said timer determining the signal elapsed time between the transceiver sending the signal downrange and receiving the reflected signal back at the transceiver, wherein the transceiver sending the signal is defined as the start time;

generating signal strength threshold values which vary with the signal elapsed time based on an expected reflected signal intensity that would be received at the transceiver from background, ambient surfaces having no highly reflective surfaces, reflectors or retro-reflectors within the field of view of the transceiver out to the distance that could have been detected by the transceiver within the respective elapsed time;

said sensor comparator comparing the intensity of the reflected signal against the generated signal strength threshold value for the determined signal elapsed time;

said sensor comparator triggering the alarm signal when said reflected signal is greater than said generated signal strength threshold value, wherein said alarm signal is one of the group of an audible signal, a visual signal, movement of a mechanical device or a vibratory signal to signal the presence of one of a highly reflective surface, a reflector or a retro-reflector within the field of view of the sensor; and said sensor comparator turning off the alarm signal when said reflected signal is less than said generated signal strength threshold value, wherein said alarm signal is one of the group of an audible signal, a visual signal, movement of a mechanical device or a vibratory signal to signal the absence of any highly reflective surface, reflector and retro-reflector within the field of view of the sensor.

2. The method of claim 1 further comprising:

a clamp for attaching said sensor body in parallel to or in series with one of the group of a firearm or a firearm scope.

3. The method of claim 1 further comprising:

a clamp for attaching said sensor body in parallel to or in series with one of the group of a firearm or a firearm scope, wherein said alarm signal is visible through optics with the firearm scope.

4. The method of claim 1 further comprising:
a clamp for attaching said sensor body in parallel to or in series with one of the group of a firearm or a firearm scope, wherein said alarm signal is vibratory and moves at least a portion of said firearm, whereby said vibratory signal can be felt throughout said firearm.

5. The method of claim 1 further comprising:
a clamp for attaching said sensor body in parallel to or in series with one of the group of a firearm or a firearm scope, wherein said alarm signal is visible and is contained with the optics of the firearm scope.

6. The method of claim 1 further comprising:
a clamp for attaching said sensor body in parallel to or in series with one of the group of a firearm or a firearm scope, wherein said alarm signal is a mechanical device that blocks the trigger of said firearm from causing the firearm to fire when said alarm signal is activated.

7. The method of claim 1, wherein said electromagnetic transceiver is a RADAR and the electromagnetic signal is a radio wave.

8. The method of claim 1, wherein said electromagnetic transceiver is a LASER and the electromagnetic signal is a light pulse.

9. The method of claim 1, wherein said electromagnetic transceiver is a LASER and the electromagnetic signal is an infrared light pulse.

10. The method of claim 1 wherein said electromagnetic transceiver transmits said electromagnetic signal in pulses.

11. The method of claim 1, wherein said electromagnetic transceiver transmits said electromagnetic signal in pulses and the electromagnetic signal is modulated to produce a uniquely identifiable signal, and said comparator only compares received reflected signals that are identified as having the same modulation as the transceiver sent electromagnetic signals.

12. The method of claim 1, wherein said electromagnetic transceiver transmits said electromagnetic signal as a beam of light through a lens to diverge the beam in the range of 1 to 4 degrees of spread.

13. The method of claim 1, wherein said sensor comparator applies a voltage across a resistor to a capacitor at said time zero, and compares the reflected signal to the voltage across the capacitor at the time the reflected signal is retrieved to determine if the reflected signal is above the signal strength threshold value.

14. A method of detecting reflectors within a field of vision, comprising:
providing a gun having a sensor body having an electromagnetic transceiver for sending and receiving an electromagnetic signal, said sensor body further having a comparator, a timer and an alarm signal;
said transceiver sending an electromagnetic signal downrange to an area of interest;
said transceiver receiving a reflected signal comprising in part the sent electromagnetic signal;
said timer calculating the signal elapsed time between the transceiver sending the signal downrange and receiving the reflected signal back at the transceiver;
storing in a lookup table a respective signal intensities for each elapsed time, and said table signal intensities being set to the hypothetical reflected signal intensity that would be received at the transceiver from natural, ambient surfaces having no highly reflective surfaces, reflectors or retro-reflectors within the field of view of the transceiver out to the distance that could have been detected by the transceiver within the respective elapsed time;
said sensor comparator using the lookup table to retrieve a respective expected signal intensity for the calculated signal elapsed time and comparing the intensity of the reflected signal against the retrieved expected signal intensity;
said sensor comparator triggering the alarm signal when said reflected signal is greater than said retrieved expected signal intensity, wherein said alarm signal is one of the group of an audible signal, a visual signal or a vibratory signal to signal the presence of one of a highly reflective surface, a reflector or a retro-reflector within the field of view of the sensor; and
said sensor comparator turning off the alarm signal when said reflected signal is less than said retrieved expected signal intensity, wherein said alarm signal is one of the group of an audible signal, a visual signal, movement of a mechanical device or a vibratory signal to signal the absence of any highly reflective surface, reflector and retro-reflector within the field of view of the sensor.

15. The method of claim 14, wherein said alarm signal is visible through optics with the firearm scope.

16. The method of claim 14, wherein said alarm signal is a mechanical device that blocks the trigger of said firearm from causing the firearm to fire when said alarm signal is activated.

17. The method of claim 14, wherein said electromagnetic transceiver is a RADAR and the electromagnetic signal is a radio wave.

18. The method of claim 14, wherein said electromagnetic transceiver is a LASER and the electromagnetic signal is a light pulse, and wherein said electromagnetic transceiver transmits said light pulse through a lens to diverge the beam in the range of 1 to 4 degrees of spread.

19. The method of claim 14, wherein said electromagnetic transceiver transmits said electromagnetic signal in pulses and the electromagnetic signal is modulated to produce a uniquely identifiable signal, and said comparator only compares received reflected signals that are identified as having the same modulation as the transceiver sent electromagnetic signals.

20. The method of claim 1, wherein the step of generating a signal strength threshold value for the signal elapsed time comprises the step of storing in a lookup table a signal strength threshold value for each signal elapsed time, and wherein said table signal strength threshold values is set to the hypothetical reflected signal intensity that would be received at the transceiver from natural, ambient surfaces having no highly reflective surfaces, reflectors or retro-reflectors within the field of view of the transceiver out to the distance that could have been detected by the transceiver within the respective elapsed time.

* * * * *